Patented Oct. 21, 1952

2,614,919

UNITED STATES PATENT OFFICE 2,614,919

PROCESS OF MAKING HERBICIDAL COMPOSITION OF MATTER

John C. R. Warren and Frederick M. M. J. Hager, Elmira, Ontario, Canada, assignors to United States Rubber Company, New York, N. Y., a corporation of New Jersey No Drawing. Application March 28, 1951, Serial No. 218,098

15 Claims. (Cl. 71—2.6)

1

This invention relates to improvements in making a composition of matter containing an ester of an aryloxyacetic acid and a surface active and emulsifying agent therefor. More particularly, it relates to an improved process which comprises effecting the esterification of an aryloxyacetic acid with an alcohol and thereafter forming in situ a surface active agent and emulsifier which is present during further formulation and is available during and after admixture of the final formulation with water or with oil to give a water emulsion or an oil solution which contains the ester of the aryloxyacetic acid and the surface active agent. Still more particularly, it relates to a novel and improved process in which a single material performs a dual role, serving as a highly effective catalyst during the esterification and being thereafter neutralized with an organic amine to form in situ a high effective surface active, wetting, dispersing and emulsifying agent which is subsequently available to perform these functions.

This invention is particularly applicable in the manufacture of those esters of aryloxyacetic acids which are useful for either plant growth regulating or weed-killing. For example, it is customary to market a concentrate of such esters, such concentrate also containing a suitable proportion of a surface active agent or emulsifier and being diluted with a suitable proportion of water or oil in the field to make the final spray emulsion or solution which is applied to the plants, weeds, shrubs or trees.

Prior to the present invention, it was customary to esterify aryloxyacetic acids by using, when necessary, an acid typified by sulfuric acid, benzene sulfonic acid, p-toluene sulfonic acid, p-chlorobenzene sulfonic acid, alkane sulfonic acids such as ethane sulfonic acid, and the like, or inorganic salts of an acidic nature such as sodium acid sulfate, as an esterification catalyst. Upon completion of esterification, if the residual catalyst was not removed it generally provided a source of decomposition of the ester product, during storage or further processing, with resulting instability. Consequently, the catalyst was removed as completely as possible after esterification by distilling the ester or by water-washing or by filtration of the crude ester—after neutralizing the catalyst when necessary. The acid catalyst was neutralized with alkaline materials, such as sodium carbonate, sodium bicarbonate, calcium hydroxide and calcium carbonate. However, removal of the catalyst was costly and complicated and was attended by a marked loss in

2 yield. Furthermore, the salts formed upon neutralization of the acid catalyst had to be removed before further formulation; such removal where the salts were in solution in the ester, was accomplished by water-washing which entailed further expense and considerable decomposition, and in addition necessitated subsequent dehydration of the water-washed ester as by distillation which is costly; in the case of insoluble salts such as were usually formed when calcium-containing alkaline materials were employed for neutralization, an expensive and troublesome filtration was required to effect removal of such salts.

In many cases, especially where the ester is to be applied ultimately in the form of a dilute water emulsion or oil solution to plants, it is highly desirable to incorporate a surface active, wetting, dispersing or emulsifying agent with the ester, preferably during preparation of the formulation which is marketed. Heretofore, all of such surface active, wetting, dispersing or emulsifying agent was a preformed material incorporated with the purified ester.

The principal object of the present invention is to overcome the disadvantages of the prior practice outlined above. Another object is to provide a novel and highly improved process whereby one material serves both as the esterification catalyst and as the basis of a considerable portion or all of the surface active agent, thereby simplifying the preparation and reducing the cost and in addition giving a stable ester product for formulation. Another object is to provide an esterification catalyst which is catalytically of the same order of activity as sulfuric acid, benzene sulfonic acid and the alkane sulfonic acids and yet which is sufficiently mild as to not catalyze decomposition in many instances where other catalysts would do so. The esterification catalyst used in our invention is in a simple and effective manner converted after esterification is complete to a highly effective surface active agent. Numerous other objects of the present invention will be apparent to those skilled in the art.

The present invention is based upon our discovery that the foregoing objects can be readily attained by carrying out the esterification of the aryloxyacetic acid with the alcohol by using an alkyl-substituted aryl sulfonic acid as the esterification catalyst, and subsequently neutralizing the alkyl-substituted aryl sulfonic acid with an organic amine whereby there is formed in situ an amine salt of the alkyl-substituted aryl sulfonic acid which functions as a surface active, wetting, dispersing or emulsifying agent when the resulting mixture is employed, usually by further formulation and often ultimate admixture with water or oil in the field to give the final spray emulsion or solution. Thus the alkyl-substituted aryl sulfonic acid functions in a dual role, serving as a highly active yet mild (in the sense that it does not cause undesirable decomposition reactions to take place) esterification catalyst and being subsequently converted by simple neutralization with the organic amine to an effective surface active or like agent.

The alkyl side chain in the alkyl-substituted aryl sulfonic acid can vary in length quite widely but should contain at least ten carbon atoms. As is well-known in the art, the properties of the salts of such sulfonic acids vary with the number of carbon atoms in the alkyl side chain. In the practice of the present invention we prefer to employ those alkyl-substituted aryl sulfonic acids wherein the alkyl side chain is derived from relatively long, straight chain or branched chain paraffin hydrocarbons especially kerosene; and wherein the aryl group is derived from aromatic hydrocarbons typified by benzene, toluene, xylene or naphthalene, these sulfonic acids being typified by keryl benzene sulfonic acid, keryl toluene sulfonic acid, keryl xylene sulfonic acid and keryl naphthalene sulfonic acid. As is well-known in the art, the term "keryl" denotes a mixture of alkyl side-chains of length ranging from $C_{12}$ to $C_{16}$ and derived from a highly saturated kerosene of paraffinic nature. Keryl benzene is made by chlorinating such a kerosene to produce predominately the monochlorinated product which is then condensed with benzene in a typical Friedel-Crafts reaction using aluminum chloride as the catalyst. The average molecular weight of keryl benzene is 260 to 270.

Our invention is particularly useful in making those esters of aryloxyacetic acids which are effective plant-growth regulators or weed-killers. Generally speaking, the aryloxyacetic acids used in practicing our invention are members of the group consisting of phenoxyacetic and naphthoxyacetic acids and their nuclearly substituted derivatives wherein the substituents (on the phenyl or naphthyl) are halogen or are alkyl radicals, especially lower alkyl radicals. It is pointed out that not all of such acids necessarily have plant growth regulating or weed-killing properties to any substantial extent. However, our invention can be employed to produce esters of aryloxyacetic acids which are of little or no value for plant growth regulating or weed-killing purposes but which are useful for other purposes in which an ester containing a surface active or like agent is desired, as for example for commingling with a plastic material, e. g., polyvinyl acetate, polyvinyl chloride or nitrocellulose, which is to be plasticized with an ester of an aryloxyacetic acid.

Our invention can be used in the preparation of esters of aryloxyacetic acids, such as beta-naphthoxyacetic acid, which are useful as a plant hormone for controlling set of fruit, producing seedless tomatoes, etc. but are of no value for killing weeds.

Our invention is often applied to chlorophenoxyacetic acids having plant growth regulating or weed-killing properties, such as polychlorophenoxyacetic acids, especially 2,4-dichlorophenoxyacetic acid (commonly designated as "2,4-D") and 2,4,5-trichlorophenoxyacetic acid (commonly denoted "2,4,5-T") or mixtures of these acids. Our invention is equally applicable in the esterification of those monochlorophenoxyacetic acids and mono- and di-chlorotoloxyacetic acids which have plant growth regulating or weed-killing action. An example of a monochlorotoloxyacetic acid having weed-killing action is 2-methyl-4-chlorophenoxyacetic acid.

As the alcohol, we can use any aliphatic or alicyclic alcohol capable of esterifying the aryloxyacetic acid. The alcohol can be monohydric or polyhydric and it can contain ether linkages or other linkages or substituent groups which do not interfere with the esterification or with the desired action of the ester, e. g., plant growth regulating, weed-killing or plasticization of resins or the like. Examples are any of the alkanols ranging from 1 to 20 or even more carbon atoms per molecule, such as methyl, ethyl, n-propyl, isopropyl, n-butyl, isobutyl, n-amyl, isoamyl, hexyl, heptyl, octyl, nonyl, decyl, and dodecyl alcohols, etc.; unsaturated alcohols such as allyl alcohol; alicyclic alcohols such as cyclopentanol and cyclohexanol; polyhydric alcohols such as ethylene glycol, glycerol, sorbitol, pentaerythritol, etc.; polyglycols such as diethylene glycol, polyethylene glycols of molecular weight 200 to 1500, polypropylene glycols, etc., ether-alcohols such as butoxyethanol, monoethoxy diethylene glycol, monomethoxy dipropylene glycol, thioglycols such as thiodiglycol.

We prefer to use the primary alcohols, the principal exception being isopropanol, which, even though it is a secondary alkanol, can be esterified readily by this method. Other secondary alcohols, such as sec-butanol and 2-methyl pentane diol-2,4, and tertiary alcohols are of less value for commercial esterification because they are more difficult in general to esterify since they decompose on heating in the presence of acids sufficiently strong to act as catalysts and because incomplete esterification results.

In practicing our invention, we usually employ the alkyl-substituted aryl sulfonic acid in an amount ranging from 0.25 to 15%, or even higher, these percentages being by weight based on the theoretical weight of the ester produced. The reaction is usually carried to substantial completion, that is until the amount of ester formed is substantially 100%, say 98–100%, of theoretical based upon the aryloxyacetic acid which is usually employed in molar deficiency relative to the alcohol. If a catalyst were not used, the extent of esterification of the aryloxyacetic acid would be much less than when the catalyst is used. In many cases, particularly in the case of the lower boiling alcohols, at least about 20% molar excess of the alcohol over the aryloxyacetic acid (i.e., at least about 1.2 alcohol groups per carboxyl group) is employed, the excess alcohol being recovered from the ester product by simple or vacuum distillation and being re-used in the process. Whether simple or vacuum distillation is used will depend on the alcohol and the ester. The same distillation can conveniently serve to remove any excess of an extraneous water-entraining agent in the reaction mixture.

In the case of the higher boiling alcohols, it is possible to obtain fairly complete esterification using 5% excess alcohol or even less. Often, particularly in the case of the lower boiling alcohols, it is expedient to use more than 20% excess alcohol especially when an extraneous entraining agent for the water is not used. Such excess alcohol can often serve as a water-entraining agent. The amount of catalyst used can vary within the range given above, depending upon many factors including the amount of surface active or like agent desired to be formed in situ by means of our invention, the skill of the formulator and the requirements of the formulation to be made. Optimum catalytic activity is generally found at from 1 to 2% of the sulfonic acid based on ester product. However, there may be cases where a considerable excess is used insofar as catalytic activity is concerned, such excess not hindering catalytic effect to any substantial degree and being available upon neutralization with the organic amine, to form a corresponding proportion of surface active or like agent.

In conducting the reaction, it is preferred to employ such conditions that the water of reaction is continuously removed in known manner, concomitantly with the esterification, as by ordinary distillation or azeotropic distillation, the distillation being carried out either at normal or reduced pressure depending upon conditions. We often prefer to carry out the esterifictaion in the presence of an inert entraining agent for the water of reaction and to azeotropically distill the esterifying mixture to remove the water continuously. As previously indicated, in some cases the alcohol itself can serve as the water-entraining agent.

When esterification is complete, the reaction mixture is treated in an obvious manner to recover therefrom any materials other than the ester product and the catalyst.

The mixture of the ester and the catalyst thus obtained is now commingled with the organic amine which is employed in amount sufficient to substantially completely neutralize the catalyst. Any free aryloxyacetic acid present can be partially or completely neutralized by using an appropriate additional amount of the organic amine. Typically the organic amine is added in amount sufficient to bring the pH of the mixture to from 4 to 7. This step of our invention is carried out in any suitable way effecting intimate intermixture and producing a homogeneous product.

The organic amine is employed in an amount substantially stoichiometrically equivalent to the long chain alkyl aryl sulfonic acid present in the esterified reaction mixture.

The ester is often completely or substantially completely free of water prior to the neutralization with the organic amine. This water generally will have been removed by distillation as the esterification takes place. The mixture which is neutralized with the organic amine should consist of the ester and the long chain alkyl aryl sulfonic acid. Water is desirably completely or substantially absent from the mixture so that a homogeneous solution will be obtained. This, of course, is desirable for subsequent formulation and minimizes corrosion and hydrolysis. The organic amine used to neutralize the sulfonic acid usually is substantially or entirely anhydrous.

The selection of the organic amine used for the neutralization will depend upon many factors including the properties of the finished formulation which are desired. We have successfully used the following: isopropylamine, triethylamine, diethanolamine, triethanolamine, di-isopropanolamine, triisopropanolamine, and the commercial product known as "Armeen C" which is a mixture of amines derived from higher fatty acids by conversion of the carboxylic acid group to the nitrile group and then reducing the nitrile group to the primary amine group. Other amines such as methoxy propylamine, octylamine, and cyclohexylamine can be used in our invention.

The organic amine can be selected from the group of amines having the general formula $$N \begin{matrix} -X \\ -Y \\ -Z \end{matrix}$$

where X, Y and Z are each selected from the group consisting of hydrogen, alkyl, hydroxyalkyl, alkoxy and cycloalkyl, not more than two of the three groups X, Y and Z being hydrogen, and preferably not more than one of them being hydrogen. The lower alkylamines and lower alkanolamines are often preferred. From the standpoint of solubility in the ester and in the oils used in formulations, the higher amines such as octylamine and "Armeen C" are generally better than the lower amines; such higher amines are excellent for purposes of chemically combining with the catalyst to produce a surface active agent; however, the salts of the long chain alkyl aryl sulfonic acid formed by such higher amines, though surface active, are difficultly soluble in water, and so do not appreciably assist in speed of emulsification in water though they may stabilize the emulsion.

The amine salt of the long chain alkyl aryl sulfonic acid is dissolved in the ester, going into solution therein as formed during the neutralization step.

The following considerations are applicable where the mixture obtained after neutralization with the amine is to be formulated into a final formulation adapted to be marketed for plant growth regulating or weed-killing purposes. We prefer to formulate by dissolving the neutralized mixture in a suitable hydrocarbon oil to give a stable concentrate ready for marketing and capable upon admixture with water or oil in the field of giving a spraying emulsion or solution of satisfactory characteristics. We often incorporate additional surface active agent of any suitable type in making the formulation; the reason for this is that usually the amount of catalyst used is insufficient to provide, upon neutralization with the organic amine, the necessary or desired concentration of surface active agent in the finished formulation or in the final spray solution. The amount of surface active agent in the final formulation should be sufficient to promote rapid emulsification and give a stable emulsion having the desired wetting properties when the farmer or other operator mixes the finished formulation with water in the field or to give a solution having the desired surface active and wetting characteristics when the operator mixes it with oil in the field. Those skilled in the art can readily select a suitable extraneous surface active agent and determine the amount thereof required for the desired results.

The oil used in formulating generally comprises an oil of essentially paraffinic nature and of petroleum origin and an oil of an aromatic nature. We can use any paraffinic oil of the proper mobility and viscosity. We prefer to use those oils which are typified by kerosene and naphtha (such as V. M. & P. naphtha or Stoddard solvent) since these are not sufficiently volatile to present an objectionable fire hazard and when the final spray composition is applied in the field they evaporate at a sufficiently low rate. We generally use a blend of aromatic and aliphatic oils. The particular oils and amounts of each used will depend upon the particular aryloxyacetic esters to be formulated, the required properties of the formulations, the availability and cost of the oils and the skill of the formulator. This phase of the manufacturing process is substantially unaffected by the practice of our invention. It is usual to include at least 20 to 30% of aromatic hydrocarbon oil in the oil used in making the formulation.

Instead of using a straight hydrocarbon oil, we can replace it partially or entirely with chlorinated aliphatic or aromatic hydrocarbon oils to give greater solubility and also reduce flammability. Alcohols and ether-alcohols are sometimes used in smaller amounts to give greater solubility.

For some purposes these esters can be used without the addition of a hydrocarbon oil and sometimes with no further addition of surface active or emulsifying agents. For example, the butyl ester of 2,4-D prepared as in Example 2, but not formulated as in Example 2, can be emulsified directly in water in an agitated spray rig (or diluted directly in diesel oil) for application as desired.

If the proper combination of amine and base oils is used, the ester and the amine salt of the long chain alkyl aryl sulfonic acid will be completely soluble in the ester formulation to give stable single-phase products.

The concentrate, i. e., the finished formulation, preferably contains at least 20% by weight of aryloxyacetic acid, this acid being present in combined form as the ester. The concentration of aryloxyacetic acid can range as high as 75 to 80% of the final formulation and can be even higher than 80% where no petroleum base oil is used in the formulation.

It is possible, and in some cases desirable, to add the amine before the esterification reaction mixture is stripped of excess alcohol and entraining agent. This, of course, can be done only with those amines which would not be removed by the subsequent operations.

In general it is easier to achieve nearly complete esterification when the catalyst is used than when it is not used. For this reason our invention is of particular value in preparing the more-difficult-to-make esters. In addition, the use of the catalyst substantially overcomes the poisoning effects of any organic carrier which may be present in the aryloxyacetic acid as a result of the use of an organic carrier process such as is shown in Warren U. S. Patent 2,480,817.

The following working examples illustrate our invention in greater detail. All parts are by weight.

*Example 1*

Esterification mixture: n-butanol 250, 2,4-D 440.

No catalyst was used. The ingredients were mixed and heated to reflux, the vapors being condensed and the condensate collected, allowed to undergo separation into an upper butanol-rich layer and a lower substantially aqueous layer. The upper butanol layer was returned to the reaction mixture. The refluxing was continued for 3 hours and 45 minutes whereupon the excess butanol was distilled from the ester product under reduced pressure. 541 parts of technical n-butyl ester of 2,4-D were obtained. This was formulated as follows:

n-Butyl ester of 2,4-D _____ 240
Shell Oil E-407 (aromatic naphtha; sp. gr. 0.893-0.910; 84% aromatics; mixed aniline point, 88° F.; B. R. 370-510° F.) _____ 90
Kerosene _____ 135
Sterox CD (polyoxyethylene ester emulsifier) _____ 35

*Example 2*

Esterification mixture: n-butanol 250, 2,4-D 440, Keryl benzene sulfonic acid 60.

The catalyst was used in an amount equal to 11% by weight of theoretical ester yield. The reaction was carried out as in the above Example 1. Refluxing was required for only 2 hours and 7 minutes. 600 parts of technical n-butyl ester of 2,4-D were obtained. This was brought to pH 5 by the addition of 10 parts isopropylamine. This was formulated as follows:

n-Butyl ester of 2,4-D _____ 265
Shell Oil E-407 _____ 90
Kerosene _____ 135
Sterox CD (emulsifier) _____ 10

It is readily seen that the formulation is identical with that of Example 1, except that 25 parts of the commercial emulsifier are replaced by 25 parts isopropylammonium keryl benzene sulfonate. This formulation gave slightly superior emulsifying properties.

*Example 3*

Esterification mixture: glycerol 93, 2,4-D 660, Keryl benzene sulfonic acid 20.

Reaction was effected by heating the mixture. The water of reaction was subsequently removed by heating at 120° to 164° C. under vacuum for ¾ hour.

*Example 4*

Esterification mixture: Isopropanol 144, 2,4-D 440, toluene 200, Keryl benzene sulfonic acid 9.3.

The reaction mixture was refluxed 1 hour and 55 minutes to azeotropically remove the water.

*Example 5*

Esterification mixture:

| | A | B |
|---|---|---|
| Butoxyethanol | 240 | 240 |
| 2,4-D | 440 | 440 |
| Toluene | 50 | 50 |
| Keryl benzene sulfonic acid | | 5 |

The time taken to remove the water of esterification in A was 1 hour 20 minutes and in B was 33 minutes.

*Example 6*

Esterification mixture: Polypropylene glycol (mol. wt. 150) 930, 2,4-D 1320, Keryl benzene sulfonic acid 33, toluene 50.

The water of reaction was removed in 1 hour 50 minutes.

*Example 7*

Esterification mixture: Celanese Solvent 203 [1] 250, 2,4-D 440, Keryl benzene sulfonic acid 11.

Water removed in 2 hours 10 minutes.

*Example 8*

Esterification mixture: Polypropylene glycol (mol. wt. 150) 156, 2,4,5-T 255, Keryl sulfonic acid 5.

Time required for esterification was 2 hours 55 minutes.

[1] Isobutanol : n-butanol : : 3 : 1.

Example 9

Esterification mixture: Butoxyethanol 240, 2,4,5-T 510, Keryl benzene sulfonic acid 5, toluene 50.

Water was removed upon heating for 3 hours 35 minutes.

In each of Examples 3 to 9 an organic amine was added to the mixture of ester and catalyst at the time of formulation to form the amine salt of the catalyst in situ. Additional typical formulations follow:

Example 10

Formulation:
| | |
|---|---|
| Butoxyethyl ester of 2,4-D (containing catalyst) from Example 5 | 55 |
| Polyoxyethylene ester-type emulsifier | 3 |
| Shell Oil TS-28 (aromatic naphtha; Sp. Gr. 0.845–0.865; 75% aromatics; mixed aniline point, 90° F., B. R., 310–400° F.) | 42 |
| Isopropylamine | 0.17 |

Example 11

Formulation:
| | |
|---|---|
| Polypropylene glycol (150) monoester of 2,4-D (containing catalyst) as from Example 6 | 13.5 |
| Butyl ester of 2,4-D containing 2% keryl benzene sulfonic acid catalyst | 40.5 |
| Shellsol (naphtha or mineral spirits, Sp. Gr. 0.792; aniline point, 123° F., B. R., 300–400° F.) | 43 |
| Polyoxyethylene ester type emulsifier | 3 |
| Isopropylamine | 0.2 |

Example 12

Esterification mixture:
| | |
|---|---|
| n-Butyl carbinol | 60 |
| 2,4-D | 110 |
| Keryl toluene sulfonic acid | 2 |

The mixture was refluxed for one hour and the water formed removed in the same way as in Example 1. The mixture was subsequently vacuum stripped to remove unreacted alcohol.

The ester obtained was formulated as follows:

| | |
|---|---|
| n-Butyl carbinol ester of 2,4-D | 40 |
| Stoddard solvent | 15.8 |
| Polyoxyethylene ester type emulsifier | 4.0 |
| Triethylamine | 0.2 |
| Velsicol AR-50 (methyl naphthalene type solvent sp. gravity 0.95–0.97, B. R. 420–520° F.) | 40 | to give a water-emulsifiable concentrate.

Example 13

Esterification mixture:
| | |
|---|---|
| Isooctyl alcohol | 50 |
| 2-methyl-4-chlorophenoxyacetic acid | 50 |
| Keryl toluene sulfonic acid | 1 |

The mixture was refluxed and the water removed in one-half hour.

The ester was formulated as follows:

| | |
|---|---|
| Isooctyl ester of 2-methyl-4-chlorophenoxyacetic acid | 15 |
| Shell TS-28 solvent | 14 |
| Polyoxyethylene ester type emulsifier | 1 |
| Triethanolamine | 0.05 |
| Butyl Cellosolve solvent (mono-n-Butyl ether of ethylene glycol) | 1 |

Example 14

Esterification mixture:
| | |
|---|---|
| Lorol No. 5 (Du Pont commercial lauryl alcohol) | 35.0 |
| Beta-naphthoxy acetic acid | 36.0 |
| Keryl toluene sulfonic acid | 1.0 |
| Benzene | 50.0 |

The water of reaction was removed azeotropically by refluxing for one hour. The benzene and excess alcohol were then removed by vacuum stripping.

The ester product was formulated as follows:

| | |
|---|---|
| Lauryl ester of beta-naphthoxy acetic acid | 10.0 |
| Toluene | 20.0 |
| Polyoxyethylene ester type emulsifier | 1.0 |
| Armeen C (mixture of higher primary aliphatic amines obtained from higher fatty acid mixture) | 0.05 |

Example 15

Esterification mixture:
| | |
|---|---|
| n-Butyl carbinol | 35.0 |
| Beta-naphthoxy acetic acid | 36.0 |
| Keryl toluene sulfonic acid | 1.0 |

The water of reaction was removed in 1½ hours. The ester was formulated as follows:

| | |
|---|---|
| n-Butyl carbinol ester of beta-naphthoxy acetic acid | 10.0 |
| Toluene | 5.0 |
| Polyoxyethylene ester type emulsifier | 1.0 |
| Triethylamine | 0.05 |

From the foregoing description, many advantages of the present invention will be apparent to those skilled in the art. Among these advantages, the following may be enumerated. The invention provides an extremely active yet mild catalyst for the esterification, comparable to sulfuric acid in activity yet mild in that it eliminates the objectionable decomposition of the ester and more especially of the alcohol by sulfuric acid; the ester is extremely stable in the presence of the long chain alkyl aryl sulfonic acid of the present invention whereas it was often objectionably unstable in the presence of the sulfuric acid heretofore used. The present invention is further highly advantageous in that it completely obviates the necessity of removing the catalyst after the esterification reaction. The present invention is especially advantageous in that instead of removing the catalyst we convert it directly and quantitatively to an excellent emulsifying, wetting, dispersing and surface active agent which is present thereafter, i. e., during subsequent formulation and during subsequent admixture with water, oil or other materials preparatory to use of the formulation. Thus, the present invention avoids the cost difficulty incidental to removal of the catalyst and at the same time utilizes the long chain alkyl aryl sulfonic acid in a dual role, namely as catalyst and later, after conversion to the amine salt, as a built-in, highly efficacious surface active and like agent. The invention also avoids any necessity for washing the ester with water after neutralization and avoids the expense of dehydrating the water-washed ester. In many cases, the process of our invention also avoids the necessity for distillation of the ester. Numerous other advantages of our invention will more fully hereinafter appear.

Having thus described our invention, what we claim and desire to protect by Letters Patent is:

1. In the process of making a composition of matter containing an ester of an aryloxyacetic acid, the steps which comprise reacting an aryloxyacetic acid with an alcohol in the presence of an alkyl-substituted aryl sulfonic acid, in which the alkyl side chain contains at least ten carbon atoms, as an esterification catalyst until esterification of said acid with said alcohol is substantially complete, thereafter neutralizing said alkyl-substituted aryl sulfonic acid with an organic amine, and thereby forming in situ an amine salt of said alkyl-substituted aryl sulfonic acid which is available as a surface active and like agent when the resulting mixture is used.

2. In the process of making a composition of matter containing an ester of an aryloxyacetic acid, the steps which comprise reacting an aryloxyacetic acid with an alcohol in the presence of a keryl aryl sulfonic acid as an esterification catalyst until esterification of said acid with said alcohol is substantially complete, thereafter neutralizing said keryl aryl sulfonic acid with an organic amine, and thereby forming in situ an amine salt of said keryl aryl sulfonic acid which is available as a surface active and like agent when the resulting mixture is used.

3. A process as set forth in claim 2 wherein said sulfonic acid is keryl benzene sulfonic acid.

4. A process as set forth in claim 2 wherein said sulfonic acid is keryl toluene sulfonic acid.

5. In the process of making a composition of matter containing an ester of an aryloxyacetic acid as the active ingredient, the steps which comprise reacting an aryloxyacetic acid with an alcohol in the presence of an alkyl-substituted aryl sulfonic acid, in which the alkyl side chain contains at least ten carbon atoms, as an esterification catalyst, in an amount ranging from 0.25 to 15% by weight based on the weight of ester theoretically to be produced, until esterification of said acid with said alcohol is substantially complete, thereafter neutralizing said alkyl-substituted aryl sulfonic acid with an organic amine, and thereby forming in situ an amine salt of said alkyl-substituted aryl sulfonic acid which is available as a surface active and like agent when the resulting mixture is used.

6. In the process of making a composition of matter containing an ester of an aryloxyacetic acid as the active ingredient, the steps which comprise reacting an aryloxyacetic acid with an alcohol in the presence of a keryl aryl sulfonic acid as an esterification catalyst in an amount ranging from 0.25 to 15% by weight based on the weight of ester theoretically to be produced, until esterification of said acid with said alcohol is substantially complete, thereafter neutralizing said keryl aryl sulfonic acid with an organic amine, and thereby forming in situ an amine salt of said keryl aryl sulfonic acid which is available as a surface active and like agent when the resulting mixture is used.

7. In the process of making a composition of matter containing an ester of an aryloxyacetic acid as the active ingredient, the steps which comprise reacting an aryloxyacetic acid with an alcohol in the presence of an alkyl-substituted aryl sulfonic acid, in which the alkyl side chain contains at least ten carbon atoms, as an esterification catalyst until esterification of said acid with said alcohol is substantially complete, recovering from the esterification reaction mixture a material consisting essentially of the ester produced and said alkyl-substituted aryl sulfonic acid, neutralizing said alkyl-substituted aryl sulfonic acid with an organic amine and thereby forming in situ an amine salt of said alkyl-substituted aryl sulfonic acid, formulating the resulting mixture into a finished formulation by dissolving it in oil to a suitable concentration, and thereby obtaining a formulation in which said amine salt of said alkyl-substituted aryl sulfonic acid is available as a surface active and like agent when said formulation is used.

8. In the process of making a composition of matter containing an ester of an aryloxyacetic acid as the active ingredient, the steps which comprise reacting an aryloxyacetic acid with an alcohol in the presence of a keryl aryl sulfonic acid, as an esterification catalyst until esterification of said acid with said alcohol is substantially complete, recovering from the esterification reaction mixture a material consisting essentially of the ester produced and said keryl aryl sulfonic acid, neutralizing said keryl aryl sulfonic acid with an organic amine and thereby forming in situ an amine salt of said keryl aryl sulfonic acid, formulating the resulting mixture into a finished formulation by dissolving it in oil to a suitable concentration, and thereby obtaining a formulation in which said amine salt of said keryl aryl sulfonic acid is available as a surface active and like agent when said final formulation is used.

9. A process as set forth in claim 8 wherein said sulfonic acid is employed in an amount ranging from 0.25 to 15% by weight based on the weight of ester theoretically to be produced.

10. In the process of making a composition of matter containing 2,4-dichlorophenoxyacetic acid as the active ingredient, the steps which comprise reacting 2,4-dichlorophenoxyacetic acid with an alcohol in the presence of a keryl aryl sulfonic acid as an esterification catalyst in an amount ranging from 0.25 to 15% by weight based on the weight of ester theoretically to be produced, employing a molecular excess of said alcohol over said 2,4-dichlorophenoxyacetic acid, continuing said reaction until esterification of said 2,4-dichlorophenoxyacetic acid with said alcohol is substantially complete, removing the excess alcohol from the resulting mixture and recovering a mixture consisting essentially of the ester product and said keryl aryl sulfonic acid, thereafter neutralizing said keryl aryl sulfonic acid with an organic amine and thereby forming in situ an amine salt of said keryl aryl sulfonic acid which serves as a surface active and like agent when the resulting mixture is used.

11. A process as set forth in claim 10 wherein said sulfonic acid is keryl benzene sulfonic acid.

12. A process as set forth in claim 10 wherein said sulfonic acid is keryl toluene sulfonic acid.

13. In the process of making a composition of matter containing 2,4,5-trichlorophenoxyacetic acid as the active ingredient, the steps which comprise reacting 2,4,5-trichlorophenoxyacetic acid with an alcohol in the presence of a keryl aryl sulfonic acid as an esterification catalyst in an amount ranging from 0.25 to 15% by weight based on the weight of ester theoretically to be produced, employing a molecular excess of said alcohol over said 2,4,5-trichlorophenoxyacetic acid, continuing said reaction until esterification of said 2,4,5-trichlorophenoxyacetic acid with said alcohol is substantially complete, removing the excess alcohol from the resulting mixture and recovering a mixture consisting essentially of the ester product and said keryl aryl sulfonic acid, thereafter neutralizing said keryl aryl sulfonic acid with an organic amine and thereby forming in situ an amine salt of said keryl aryl sulfonic acid which serves as a surface active and like agent when the resulting mixture is used.

14. A process as set forth in claim 13 wherein said sulfonic acid is keryl benzene sulfonic acid.

15. A process as set forth in claim 13 wherein said sulfonic acid is keryl toluene sulfonic acid.

JOHN C. R. WARREN.
FREDERICK M. M. J. HAGER.

REFERENCES CITED

The following references are of record in the file of this patent:

UNITED STATES PATENTS

| Number | Name | Date |
| --- | --- | --- |
| 2,314,255 | Toone | Mar. 16, 1943 |
| 2,390,941 | Jones | Dec. 11, 1945 |